United States Patent
Kraus

(10) Patent No.: US 12,479,036 B2
(45) Date of Patent: Nov. 25, 2025

(54) TWIST DRILL BIT HAVING A CUTTING TIP WITH A STEPPED STRUCTURE

(71) Applicant: Guehring KG, Albstadt (DE)

(72) Inventor: Markus Kraus, Burladingen (DE)

(73) Assignee: Guehring KG, Albstadt (DE)

( * ) Notice: Subject to any disclaimer, the term of this patent is extended or adjusted under 35 U.S.C. 154(b) by 449 days.

(21) Appl. No.: 17/662,109

(22) Filed: May 5, 2022

(65) Prior Publication Data
US 2022/0339714 A1 Oct. 27, 2022

Related U.S. Application Data

(63) Continuation of application No. PCT/DE2020/100997, filed on Nov. 25, 2020.

(30) Foreign Application Priority Data

Dec. 20, 2019 (DE) ..................... 10 2019 135 404.8

(51) Int. Cl.
 *B23B 51/02* (2006.01)
 *B23B 51/00* (2006.01)

(52) U.S. Cl.
 CPC ...... *B23B 51/009* (2013.01); *B23B 2251/287* (2013.01)

(58) Field of Classification Search
 CPC ..... B23B 51/009; B23B 51/08; B23B 51/108; B23B 2251/287; B23B 2251/285; B23B 2251/087; B23B 2251/085
 See application file for complete search history.

(56) References Cited

U.S. PATENT DOCUMENTS

| 38,119 A | 4/1863 | Morse |
|---|---|---|
| 248,854 A | 11/1881 | Gladwin |

(Continued)

FOREIGN PATENT DOCUMENTS

| AT | 12005 | 9/2011 |
|---|---|---|
| CN | 1375373 A | 10/2002 |

(Continued)

OTHER PUBLICATIONS

International Search Report and Written Opinion dated Mar. 1, 2021 (Application No. PCT/DE2020/100997).

(Continued)

*Primary Examiner* — Ryan Rufo
(74) *Attorney, Agent, or Firm* — Brown & Brown IP Law PLLC

(57) ABSTRACT

Twist drill bit having a cutting tip (3) with a stepped structure, consisting of a shank (1), a guide region (2) and the adjoining cutting tip (3) with a stepped structure, the stepped structure of which is interrupted by two flutes (5) winding about a drill bit axis (0), wherein the cutting tip (3) with a stepped structure has a drill bit tip (3.1) with a radius ($r_0$), at which a pair of first main lips (4.1) are formed, and a multiplicity of coaxially arranged cutting steps (3.2), which each have a conical step portion (3.2.1), in which in each case a pair of further main lips ($4.2_a$-$4.2_m$) are formed, and a cylindrical step portion (3.2.2), wherein the cylindrical step portions (3.2.2) have, towards the shank (1), an increasingly large radius ($r_a$-$r_m$), wherein the difference between in each case one of the radii and the next one of the radii ($\Delta r$) is chosen such that, upon rotation about the drill bit axis (0), the pair of further main lips ($4.2_a$-$4.2_m$) arranged therebetween sweep in each case over an annular face ($A_a$-$A_m$), coaxial with the drill bit axis (0), on an imaginary plane (E) arranged perpendicularly to the drill bit axis (0), and the (Continued)

Figure 2A:
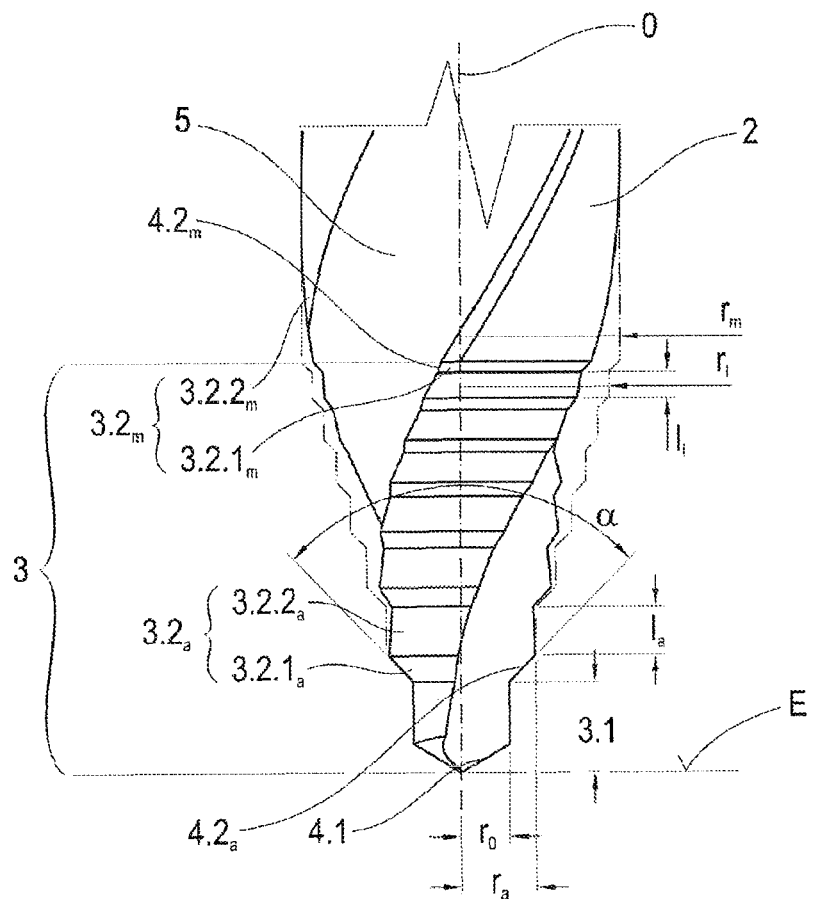

annular faces ($A_a$-$A_m$) have an identical surface area, such that, during drilling, an identical chip volume is carried away with each pair of the further main lips ($4.2_a$-$4.2_m$).

2 Claims, 3 Drawing Sheets

(56) References Cited

U.S. PATENT DOCUMENTS

| | | | |
|---|---|---|---|
| 716,557 | A | 12/1902 | Klingensmith |
| 1,557,900 | A | 10/1925 | Thompson |
| 2,193,186 | A | 3/1940 | Bannister |
| 2,276,532 | A | 3/1942 | Welty |
| 2,786,373 | A | 3/1957 | Patton |
| 2,858,718 | A | 11/1958 | Kohler |
| 3,564,947 | A | 2/1971 | Maier |
| 3,758,222 | A | 9/1973 | Oakes |
| 4,189,266 | A | 2/1980 | Koslow |
| 4,536,107 | A | 8/1985 | Sandy |
| 4,582,456 | A | 4/1986 | Imai |
| 4,582,458 | A * | 4/1986 | Korb ..................... B23B 51/009 408/224 |
| 5,088,863 | A | 2/1992 | Imanaga |
| 5,442,979 | A | 8/1995 | Hsu |
| 5,452,971 | A | 9/1995 | Nevills |
| 5,466,100 | A | 11/1995 | Ahluwalia |
| 5,503,237 | A | 4/1996 | Neukirchen |
| 5,570,978 | A | 11/1996 | Rees |
| 5,636,948 | A | 6/1997 | Rexius |
| 5,807,039 | A | 9/1998 | Booher |
| 5,846,035 | A | 12/1998 | Karafillis |
| 6,213,692 | B1 | 4/2001 | Guehring |
| 6,309,149 | B1 | 10/2001 | Borschert |
| 6,428,250 | B2 | 8/2002 | Giebmanns |
| 6,890,133 | B2 | 5/2005 | Singh |
| D544,892 | S | 6/2007 | Watson |
| 7,357,606 | B1 | 4/2008 | Pettit |
| 8,029,215 | B2 | 10/2011 | Gentry |
| 8,215,206 | B2 | 7/2012 | Kozak |
| 8,485,066 | B2 | 7/2013 | Kozak |
| 8,602,698 | B2 * | 12/2013 | Craig ....................... B23C 5/10 408/1 R |
| 8,784,017 | B2 | 7/2014 | Ibarra |
| 9,409,239 | B2 * | 8/2016 | Higashiwaki ......... B23B 51/009 |
| 9,475,128 | B2 | 10/2016 | Sawabe |
| 9,500,038 | B2 | 11/2016 | Neitzell |
| 9,539,653 | B2 | 1/2017 | Rogalla |
| 10,010,332 | B2 | 7/2018 | Atabey |
| 10,058,929 | B2 | 8/2018 | Durfee |
| D840,449 | S | 2/2019 | Wang |
| 10,328,499 | B2 | 6/2019 | Durfee |
| D881,957 | S | 4/2020 | Wang |
| D892,183 | S | 8/2020 | Parendo |
| 10,751,810 | B2 | 8/2020 | Wang |
| D894,978 | S | 9/2020 | Misumi |
| 11,007,583 | B2 | 5/2021 | Wang |
| 11,007,584 | B2 | 5/2021 | Wang |
| 11,192,196 | B2 * | 12/2021 | Hechtle ................ B23D 77/006 |
| 11,554,424 | B1 | 1/2023 | Wang |
| 11,865,627 | B1 | 1/2024 | Wang |
| 2001/0010784 | A1 | 8/2001 | Giebmanns |
| 2005/0053438 | A1 | 3/2005 | Wetzl |
| 2006/0078393 | A1 | 4/2006 | Lin |
| 2006/0285935 | A1 | 12/2006 | Lin |
| 2007/0160437 | A1 | 7/2007 | Shultz |
| 2011/0116884 | A1 | 5/2011 | Li |
| 2012/0195704 | A1 | 8/2012 | White |
| 2012/0201619 | A1 | 8/2012 | Olsson |
| 2012/0301239 | A1 | 11/2012 | Prom |
| 2012/0321403 | A1 | 12/2012 | Higashiwaki |
| 2014/0023445 | A1 | 1/2014 | Allen |
| 2014/0212234 | A1 | 7/2014 | Sawabe |
| 2014/0363244 | A1 * | 12/2014 | Allen .................. B23B 51/0081 408/16 |
| 2014/0369776 | A1 | 12/2014 | Durfee |
| 2017/0129022 | A1 | 5/2017 | Durfee |
| 2017/0216979 | A1 | 8/2017 | Prom |
| 2018/0133808 | A1 | 5/2018 | Wang |
| 2018/0196703 | A1 | 7/2018 | Tong |
| 2020/0094331 | A1 | 3/2020 | Wang |
| 2020/0222994 | A1 | 7/2020 | Allen |
| 2020/0406375 | A1 | 12/2020 | Misumi |
| 2021/0060662 | A1 | 3/2021 | Wang |

FOREIGN PATENT DOCUMENTS

| | | | |
|---|---|---|---|
| CN | 101977713 | | 2/2011 |
| CN | 102126039 | | 7/2011 |
| CN | 202137424 | | 2/2012 |
| CN | 102581355 | A | 7/2012 |
| CN | 103084629 | | 5/2013 |
| CN | 203356678 | | 12/2013 |
| CN | 203649486 | | 6/2014 |
| CN | 104493264 | A | 4/2015 |
| CN | 204953985 | | 1/2016 |
| CN | 106001708 | A | 7/2016 |
| CN | 205551557 | | 9/2016 |
| CN | 107262786 | A * | 10/2017 |
| DE | 195 26 686 | | 3/1996 |
| DE | 29904042 | U1 * | 7/1999 ........... B23B 51/009 |
| DE | 200 15 550 | U1 | 11/2000 |
| DE | 203 03 656 | U1 | 6/2003 |
| DE | 202008000368 | U1 * | 4/2008 ........... B23B 49/005 |
| DE | 20-2009-000930 | U | 5/2009 |
| DE | 10-2008-049509 | | 3/2010 |
| DE | 20-2011-106232 | | 12/2011 |
| EP | 2550123 | B1 | 1/2013 |
| EP | 3 305 447 | A1 | 4/2018 |
| FR | 725505 | | 5/1932 |
| GB | 123605 | A * | 3/1919 |
| GB | 2318072 | | 4/1998 |
| GB | 2405820 | | 3/2005 |
| JP | H04-35812 | U | 3/1992 |
| JP | 63-16912 | | 4/2018 |
| KR | 2009-0014835 | | 2/2009 |
| WO | 1997/031741 | A1 | 2/1997 |
| WO | 2008/092386 | | 8/2008 |
| WO | 2009/066935 | A1 | 5/2009 |
| WO | 2012/167448 | | 6/2011 |
| WO | 2013/077857 | | 5/2013 |
| WO | 2017/129022 | | 8/2017 |
| WO | 2017/136966 | | 8/2017 |
| WO | 2018/120274 | | 7/2018 |
| WO | 2019/147885 | A1 | 8/2019 |
| WO | 2020/031259 | | 2/2020 |
| WO | 2020/092462 | | 5/2020 |
| WO | 2020/165378 | | 8/2020 |

OTHER PUBLICATIONS

DPMAregister Printout dated May 4, 2022.
Aerospace Industries Association National Aerospace Standard 907 (Aug. 1997).
Matco Tools Hyper-Step Drill Bits brochure (2018).
Schneider, "Cutting Tool Applications, Chapter 2: Metal Removal Methods," *American_Machinist* (Nov. 2009).
Society of Mfg Engineers, Tool and Manufacturing Engineers Handbook (1983).
Viking Drill & Tool Product Catalog.

* cited by examiner

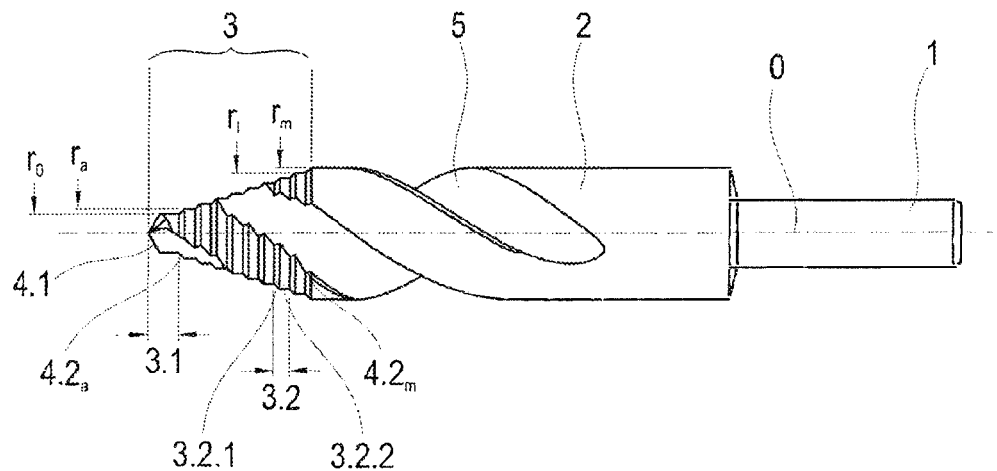
- Prior Art -
Fig. 1a
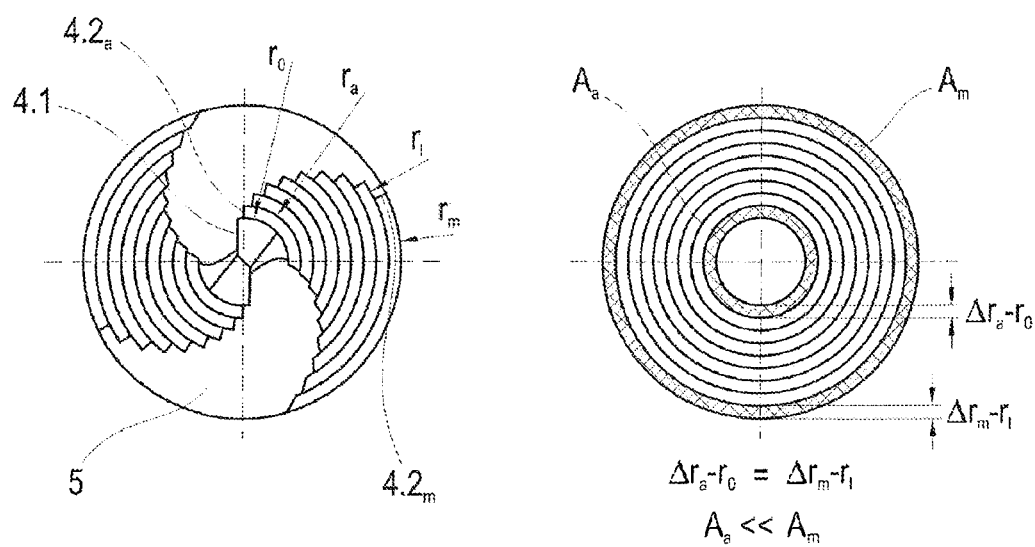
- Prior Art -
Fig. 1b
- Prior Art -
Fig. 1c $\Delta r_b - r_0 > \Delta r_m - r_k$
$A_a + A_b = A_i + A_m$

TWIST DRILL BIT HAVING A CUTTING TIP WITH A STEPPED STRUCTURE

The invention relates to a twist drill bit having a cutting tip with a stepped structure, which represents an interchangeable accessory for a drilling machine and which is generically known from EP 3 305 447 A1.

Twist drill bits and step drill bits, which are provided for various applications, belong to the drill bits known from the prior art.

By means of twist drill bits, holes of a respective predetermined diameter can be drilled through materials, which have a material thickness, which is smaller than the length of the guide region (length of the twist drill bit minus a shank region) of the twist drill bit. The actual cutting process takes place here by means of two main cutting edges, which are formed on the drill bit tip of the drill bit and which extend from a chisel edge crossing the drill bit axis all the way to the circumferential surface of the drill bit, and to which two chip flutes connect, which wind about the drill bit axis, along the guide region. During the entire drilling process, identical material quantities are cut, for which a corresponding torque has to be applied. The larger the diameter of a hole, which is to be drilled through, the longer the cutting edges and the larger the cutting pressure on the cutting edges and the smaller the cutting speed has to be selected.

Step drill bits are used in order to drill holes through thin-walled material or to drill out holes in a thin-wall material. Due to the fact that a typical length for a drill bit is significantly larger than the thickness of the thin-walled material, which is to be drilled through, the option results that several cutting steps are formed over the drill bit length, by means of which an increasingly larger hole can in each case be drilled gradually.

Along a drill bit axis, step drill bits generally have a shank and a cutting head, which is connected directly to the shank or indirectly to the shank via a transition piece. The cutting head has a cutting tip having a pair of first main cutting edges and a plurality of cutting steps. The cutting steps are arranged coaxially to the drill bit axis and, starting at the cutting tip stepped all the way to the shank, have an increasingly larger diameter. The cutting steps have to thereby in each case have a step height, which is larger than the thickness of the material, which is to be drilled through, so that through holes having a respective diameter can be drilled. The cutting steps always have a cylindrical step portion, which in each case takes over the function of a guide region here, and a conical step portion, which connects two adjacent cylindrical step portions to one another and at which further pairs of main cutting edges are located in each case.

This means that the thicker the material, which is to be drilled through, the fewer cuttings steps a step drill bit, which is suitable for this purpose, can have. So that it is safely prevented after the production of a drill hole having a desired diameter that the main cutting edges of the next cutting step already engage, the step height is at least slightly higher than the thickness of the material, which is to be drilled through. For the removal of the resulting drilling chips, two chip flutes extend over the entire length of the cutting head. The step drill bit would also be functional with only one chip flute. There would then also be only one main cutting edge or more than two chip flutes for each cutting step. They can generally run parallel to the drill bit axis or can advantageously wind about the drill bit axis, as in the case of twist drill bits.

A step drill bit is disclosed in DE 200 15 550 U1, which has the features of a step drill bit, as it has generally been described as prior art, and which is to be characterized in that it has cylindrical portions, which have a different axial length. It is specified here as a problem to be solved that the holes to be drilled serve the purpose on the one hand that for example a threaded bolt is inserted through them and is fixed in a sheet metal part by means of a counter nut, and on the other hand that a self-tapping screw is screwed into the through hole. The two fastening types are generally used alternatively, depending on the material thickness. In order to drill holes for both connection types, in the alternative, it is proposed here to embody the step drill bit with alternately long cutting steps.

A step drill bit is known from DE 203 03 656 U1, having cutting steps, in each case comprising one or also several conical step portions merging into one another, as well as a cylindrical step portion. The conical step portions as well as the cylindrical step portions can have an identical, but also a different length for the individual cutting steps in the axial direction. It is specified in particular that the cylindrical step portions can alternately have a smaller and a larger axial length. The length of the shorter portions is to thereby advantageously be ≤3 mm, and the length of the longer step portions is to be ≥3 mm and ≤6 mm, and commencing with a cylindrical step portion having a smaller axial length downstream from the cutting tip. Several conical step portions merging into one another for each cutting step result in that narrower chips are created, which can be removed better via the chip flutes.

It can be summarized for step drill bits that the individual cutting steps have an axial length, which is determined by the thickness of the material, which is to be drilled, and that the diameter differences of adjoining cutting steps are determined by the hole diameters, which are to be drilled by means of the step drill bit.

A twist drill bit having a cutting tip with a stepped structure is known from the above-mentioned EP 3 305 447 A1, which combines both features of a classical twist drill bit, but also of a step drill bit. Such a twist drill bit having a cutting tip with a stepped structure includes a shank region, as do all drill bits, a guide region, as do twist drill bits, and a cutting tip with a stepped structure having a drill bit tip, similar to a cutting head of a step drill bit.

Along the cutting tip, arranged coaxially downstream from a drill bit tip, at which a first pair of main cutting edges is located, several cutting steps are present, which in each case have a conical step portion and a cylindrical step portion, wherein the diameter of the cylindrical step portions increases towards the shank. The cutting steps are interrupted by two chip flutes, which wind about the drill bit axis from the drill bit tip all the way to the shank along the guide region. The edges along the chip flutes are stepped according to the cutting steps and form the plurality of further main cutting edges (here first cutting edges) at the conical step portions and minor cutting edges (here second cutting edges) at the cylindrical step portions. The main and the minor cutting edges thus have a step-like structure, wherein the main cutting edges and the minor cutting edges in each case draw an angle of between 90° and 140° with one another. The main cutting edges are to preferably run parallel to one another, whereby they in each case draw an identical angle with the drill bit axis.

In order to cut a drill hole equal to the diameter of a twist drill bit, the main cutting edge, which is present there, is quasi divided into a plurality of main cutting edges. The torque otherwise acting on only the one main cutting edge is divided here between the plurality of correspondingly shorter main cutting edges. It is therefore advantageous to have the greatest possible number, but shorter main cutting edges. The axial length of the cylindrical step portions results here from the prefabrication of the further main cutting edges to the drill bit base body in the region of the cutting head, which, as illustrated in FIG. 1 of the above-mentioned EP 3 305 447 A1, has an acute flank angle of an encasing circumferential surface. In that flutes, which are parallel to one another, are introduced into this base body, the cutting steps having the conical and the cylindrical step portions are created. The cylindrical step portions can generally also differ from a cylindrical shape because, in contrast to the step drill bits, they do not have a guide function. It is specified that the main cutting edges can have an identical or a gradually increasing height.

As already mentioned, an advantage of such a twist drill bit known from the above-mentioned EP 3 305 447 A1 having a cutting tip with a stepped structure can be found in that the torque acting on the drill bit is divided between the individual main cutting edges. The cutting pressure, in particular on the corners of the main cutting edge, thus becomes comparatively lower, which leads to a lower wear and a longer service life. Compared to a twist drill bit, the speed for drilling a hole having an identical diameter can be increased significantly, which accelerates the drilling process. Cutting forces having less of an effect on the individual main cutting edges moreover lead to a lower friction and thus to a slower heat-up, which, in turn, reduces the demands on a cooling system.

With regard to the main cutting edges, it can be gathered from the above-mentioned EP 3 305 447 A1 that they advantageously parallel and either have an identical height or a height increasing gradually towards the shank. It is not specified, what could in particular be the basis for the advantage of an increasing height of the main cutting edges in the direction of the shank. Main cutting edges of identical height as well as main cutting edges, the height of which increase towards the shank, lead to a different chip volume, which is created with the individual cutting steps.

It is the object of the invention to improve a twist drill bit having a cutting tip with a stepped structure.

This object is solved for a twist drill bit having a cutting tip with a stepped structure either by means of the features of claim 1 or of claim 2.

The invention relates to a twist drill bit having a cutting tip with a stepped structure, consisting of a shank, a guide region, and the adjoining cutting tip with a stepped structure. The stepped structure of the cutting tip is interrupted by two chip flutes winding about a drill bit axis. The cutting tip with a stepped structure is a drill bit tip with a radius, at which a pair of first main cutting edges is formed, and which has a plurality of coaxially arranged cutting steps. These cutting steps in each case have a conical step portion, in which a pair of further main cutting edges is formed in each case, and a cylindrical step portion, wherein the cylindrical step portions have an increasingly larger radius towards the shank. The difference between a respective one of the radii and a next one of the radii is selected so that upon rotation about the drill bit axis, the pair of the further main cutting edges arranged therebetween in each case sweeps over an annular surface, which is coaxial to the drill bit axis, on an imaginary plane, which is arranged perpendicularly to the drill bit axis. The annular surfaces have an identical surface area, so that an identical chip volume is removed during the drilling with each pair of the further main cutting edges.

The invention relates to a twist drill bit having a cutting tip with a stepped structure, consisting of a shank and the cutting tip with a stepped structure adjoining directly or indirectly thereon. This stepped structure is interrupted by two chip flutes winding about a drill bit axis. The cutting tip with a stepped structure consists of a drill bit tip with a radius, at which a pair of first main cutting edges are formed, and a plurality of coaxially arranged cutting steps. The cutting steps in each case have a conical step portion, in which a pair of further main cutting edges is formed in each case, and a cylindrical step portion, wherein the cylindrical step portions have an increasingly larger radius towards the shank.

The difference between a respective one of the radii and a next but one of the radii is selected so that upon rotation about the drill bit axis, the two pairs of the further main cutting edges arranged therebetween in each case sweep over an annular surface, which is coaxial to the drill bit axis, on an imaginary plane, which is arranged perpendicularly to the drill bit axis. The annular surfaces have an identical total surface area in pairs, so that an identical total chip volume is removed in each case during the drilling with two adjacent pairs of the further main cutting edges.

Due to the fact that the annular surfaces have an identical total surface area in pairs, so that an identical total chip volume is in each case removed during the drilling with two adjacent pairs of the further main cutting edges, advantages result with regard to the drilling quality, in particular under the aspect of dimensional stability and circularity.

Due to this design, the percentage of the small first step diameters in the guidance of the drill bit in the component is larger, so that a drilling quality, which is improved with respect to dimensional stability and circularity, is likewise attained therewith. This applies in particular for drill bits with very good self-centering properties. In the case of such drill bits, the small drilling diameter centers very well and the percentage of this small drilling diameter in the guidance of the drill bit is larger in the hole due to the step length, which is identically long or longer in the front, compared to the following step lengths with larger diameter, whereby a better drilling quality is attained.

Figure 2B:
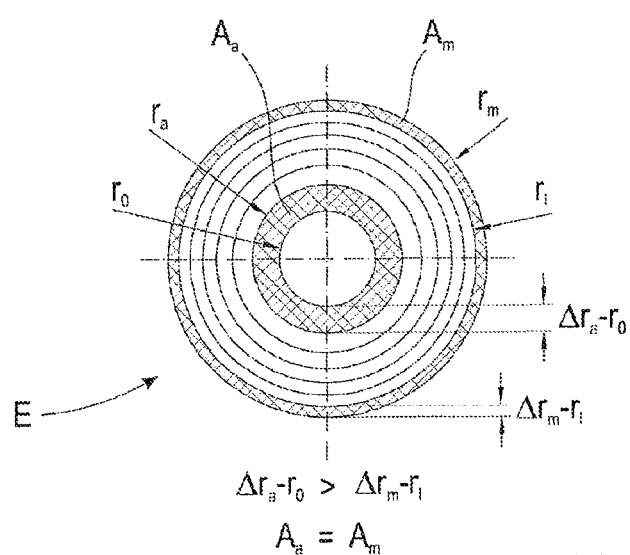
Figure 3A:
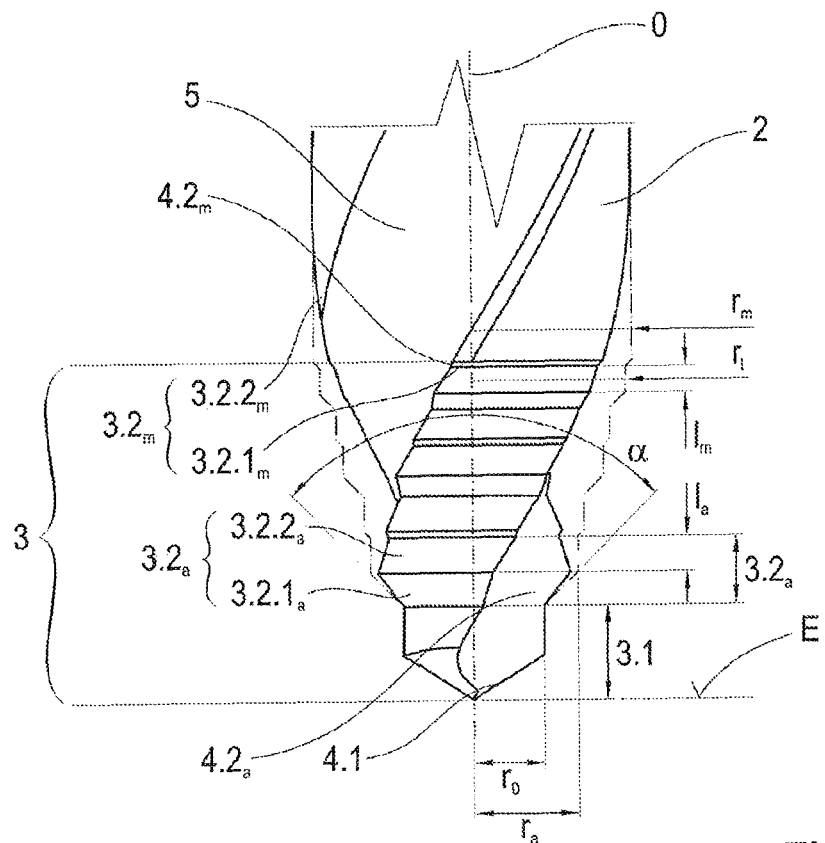
Figure 3B:
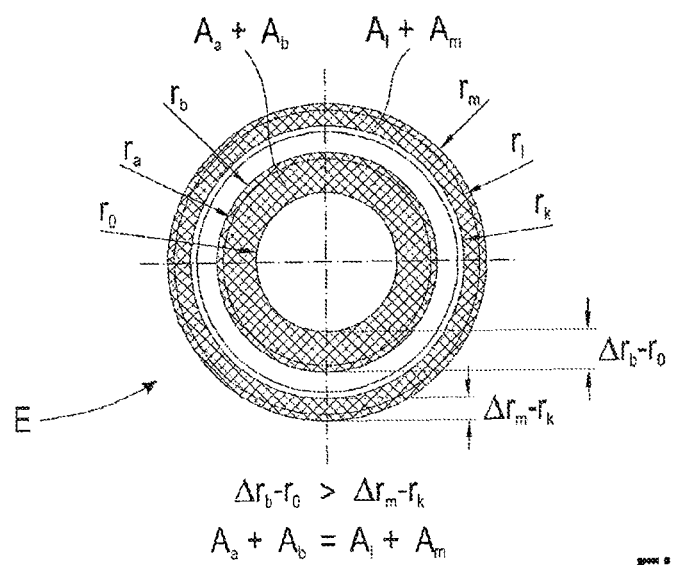

Embodiments of the invention will be described in more detail below on the basis of drawings, in which:

FIGS. 1*a*-1*c* show a twist drill bit having cutting tip with a stepped structure according to the prior art in various views, FIGS. 2*a*-2*b* show a first embodiment of a twist drill bit according to the invention having a cutting tip with a stepped structure in various views, and FIGS. 3*a*-3*b* show a second embodiment of a twist drill bit according to the invention having a cutting tip with a stepped structure in various views.

The invention relates to a twist drill bit having a cutting tip 3 with a stepped structure (hereinafter drill bit), as illustrated in FIGS. 2*a*-2*b* and 3*a*-3*b*. In the same way as drill bits known from the prior art, as shown by means of an example in FIGS. 1*a*-1*c*, said twist drill bit has a shank 1, by means of which the drill bit can be clamped into a drill chuck of a drilling machine. Adjoining the shank 1, a guide region 2, which has a length in the direction of the drill bit axis 0, which is larger than the thickness of the material, which is to be drilled, follows in the direction of a drill bit axis 0. The cutting tip 3 with a stepped structure (hereinafter cutting tip 3), the stepped structure of which is interrupted by two chip flutes 5 winding about the drill bit axis 0, connects to the guide region 2. Its maximum outer diameter corresponds to the outer diameter of the guide region 2. The cutting tip 3 with a stepped structure has a drill bit tip 3.1, at which a pair of first main cutting edges 4.1 is formed. The first main cutting edges 4.1 are connected to one another via a chisel edge, which crosses the drill bit axis 0. Due to the fact that the hole diameter of the drill holes, which can be drilled by means of the drill bit, is produced by means of a plurality of main cutting edges, the radius $r_0$ of the drill bit tip 3.1 can be small, and the first main cutting edges 4.1 can be embodied to be short, whereby the chisel edge can also be of a filigree embodiment, which allows for a good centering of the drill bit. Any number of cutting steps 3.2 connects to the drill bit tip 3.1, in each case formed by means of a conical step portion 3.2.1 and a cylindrical step portion 3.2.2. The first cutting step 3.2 is identified with a in the drawings, the last one with m, wherein the last cutting step 3.2 merges into the guide region 2. A pair of further main cutting edges 4.2$_a$-4.2$_m$ is in each case formed in the conical step portions 3.2.1. The cylindrical step portions 3.2.2 have an increasingly larger radius $r_a$-$r_m$ towards the shank 1. Due to the fact that this drill bit is not used to drill holes with different diameters, as with a step drill bit, but holes having an identical diameter, which corresponds to the diameter of the last cutting step 3.2, it is generally not important which diameter the individual cutting steps 3.2 have, as long as they become larger in the direction towards the shank 1. This makes it possible to select the diameters so that, as improvement compared to the prior art, at least approximately identical chip volumes are created by means of the individual cutting steps 3.2. It is shown in FIG. 1c how the surface areas of an annular surface $A_a$-$A_m$, machined by means of one of the first cutting steps 3.2 or one of the last cutting steps 3.2 towards the shank, respectively, differ when, as specified as being advantageous in the prior art, the main cutting edges run parallel to one another and have an identical height. FIG. 1b shows a top view onto such a drill bit, which is known from the prior art, in the direction towards the shank 1.

It is essential for the invention that during the drilling, the pairs of the further main cutting edges 4.2, see FIGS. 2a-2b, or in each case two adjacent pairs of the further main cutting edges 4.2 together, see FIGS. 3a-3b, in each case sweep over an annular surface $A_a$-$A_m$ with an identical surface area, whereby they remove an identical chip volume over the depth of the resulting drill hole.

So that the removed chip volume of two adjacent pairs of the further main cutting edges 4.2 is identical, the difference of the radii Δr between two adjacent cylindrical step portions 3.2.2 or the radius $r_0$ of the drill bit tip 3.1 and the radius of the first one of the conical step portions 3.2.1$_a$, or in other words, one of the radii, with a next one of the radii is in each case selected so that upon rotation about the drill bit axis 0, the pair of the further main cutting edges 4.2$_a$-4.2$_m$ arranged therebetween in each case sweeps over an annular surface $A_a$-$A_m$, which is coaxial to the drill bit axis 0, on an imaginary plane E, which is arranged perpendicularly to the drill bit axis 0, and the annular surfaces $A_a$-$A_m$ have an identical surface area, in other words, that the projection of the further main cutting edges 4.2 in each case sweep over annular surface $A_a$-$A_m$ of identical surface areas (see FIGS. 2a-2b with regard to this). The pairs of the further main cutting edges 4.2 can in each case have an identical length and can draw different cutting angles α with the drill bit axis 0, or can have a different length and draw identical cutting angles with the drill bit axis 0. The length $l_a$-$l_1$ of the cylindrical step portions 3.2.2, which can generally be arbitrary for the function of the drill bit, thereby follows inevitably in both alternatives.

In the case of a large number of cutting steps 3.2, the pairs of the further main cutting edges 4.2 are in each case short, whereby the change of the chip volumes of two adjoining cutting steps 3.2 is also smaller than in the case of longer further main cutting edges 4.2. The idea of the invention can thus also already be benefitted from when each pair of the further main cutting edges 4.2 does not remove an identical chip volume, but when a similar chip volume is ultimately removed via all pairs of the further main cutting edges 4.2. In practice, a similar chip volume is created, e.g., when, as shown in FIGS. 3a-3c, the difference between one of the radii and a next but one of the radii Δr is selected so that upon rotation about the drill bit axis 0, the two pairs of the further main cutting edges 4.2$_a$-4.2$_m$) arranged therebetween in each case sweep over an annular surface $A_a$-$A_m$, which is coaxial to the drill bit axis 0, on an imaginary plane E, which is arranged perpendicularly to the drill bit axis 0, and the annular surfaces $A_a$-$A_m$ have an identical total surface area in pairs.

In that the chip volume for the cutting steps 3.2 is identical or at least similar, the density of the chips removed via the chip flutes 5, after a complete penetration of the cutting tip 3 into a workpiece, is more homogenous in the chip flutes 5 than in the case of a drill bit according to the prior art, which facilitates, e.g., an extraction by suction of the chip volume.

LIST OF REFERENCE NUMERALS

0 drill bit axis
1 shank
2 guide region
3 cutting tip (with a stepped structure)
3.1 drill bit tip
3.2($_a$-3.2$_m$) cutting step
3.2.1($_a$-3.2.1$_m$) conical step portion
3.2.2($_a$-3.2.2$_m$) cylindrical step portion
4.1 first main cutting edge
4.2($_a$-4.2$_m$) further main cutting edges
5 chip flute
$l_a$-$l_1$ length of a cylindrical step portion 3.2.2
$r_a$-$r_m$ radius of a cylindrical step portion 3.2.2
Δr($_0 r_a$-Δr$_1$ $r_m$) difference between adjacent radii
$r_0$ radius of the drill bit tip 3.1
E imaginary plane
$A_a$-$A_m$ annular surface
α cutting angle

The invention claimed is:

1. A twist drill bit, comprising a shank, a guide region, and a cutting tip,
the twist drill bit comprising a drill bit rotary axis,
the cutting tip comprising a plurality of cutting steps and two chip flutes winding about the drill bit rotary axis, each of the cutting steps coaxial with the drill bit rotary axis,
each of the plurality of cutting steps comprising a conical step portion and a cylindrical step portion,
each cylindrical step portion has a respective radius,
in the plurality of cutting steps: in a sequence from a cutting step that is farthest from the shank to a cutting step that is closest to the shank, the respective radii are increasingly larger,
the two chip flutes dividing each conical step portion into a pair of conical step portion sections and dividing each cylindrical step portion into a pair of cylindrical step portion sections,
each conical step portion comprising a respective pair of main cutting edges, each main cutting edge:

is adjacent to a respective chip flute of the two chip flutes, and spans a respective conical step portion section from a respective first intersection point with one cylindrical step portion to a respective second intersection point with another cylindrical step portion, the cutting step closest to the shank is a first of said plurality of cutting steps, the respective pair of main cutting edges of the first conical step portion is a first pair of main cutting edges, each of the first pair of main cutting edges extending from the respective first intersection point to the respective second intersection point, the respective first intersection point spaced from the drill bit rotary axis by a first radial distance, the respective second intersection point spaced from the drill bit rotary axis by a second radial distance, a first imaginary annular surface is defined in a plane perpendicular to the drill bit rotary axis, the first imaginary annular surface is defined by a first radially inner annular boundary and a first radially outer annular boundary, the first radially outer annular boundary defined by a first projection onto the plane of the respective first intersection point at the first radial distance via a 360° rotation of the drill bit about the drill bit rotary axis, the first radially inner annular boundary defined by a second projection onto the plane of the respective second intersection point at the second radial distance via the 360° rotation of the drill bit about the drill bit axis, the first imaginary annular surface having a first surface area defined by the first inner annular boundary and the first outer annular boundary, the cutting step furthest from the shank is a second of said plurality of cutting steps, the respective pair of main cutting edges of the second conical step portion is a second pair of main cutting edges, each of the second pair of main cutting edges extending from the respective first intersection point to the respective second intersection point, the respective first intersection point spaced from the drill bit rotary axis by a third radial distance, the respective second intersection point spaced from the drill bit rotary axis by a fourth radial distance, a second imaginary annular surface is defined by a second radially inner annular boundary and a second radially outer annular boundary, the second radially outer annular boundary defined by a third projection onto the plane of the respective first intersection point at the third radial distance via the 360° rotation of the drill bit about the drill bit rotary axis, the second radially inner annular boundary defined by a fourth projection onto the plane of the respective second intersection point at the fourth radial distance via the 360° rotation of the drill bit about the drill bit axis, the second imaginary annular surface having a second surface area defined by the second inner annular boundary and the second outer annular boundary, wherein the first radial distance is different from the third radial distance, wherein the drill bit rotary axis is stationary during the 360° rotation, wherein the first surface area is equal to the second surface area.

2. The twist drill bit recited in claim 1, wherein the first radial distance is the largest radial distance of all of said main cutting edges, and the fourth radial distance is the smallest radial distance of all of said main cutting edges.

* * * * *